United States Patent
Pelletier (10) Patent No.: US 6,762,797 B1
(45) Date of Patent: Jul. 13, 2004

(54) METHOD AND APPARATUS FOR CATCH-UP VIDEO VIEWING

(75) Inventor: Daniel Pelletier, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/291,841

(22) Filed: Apr. 14, 1999

(51) Int. Cl.[7] .............. H04N 8/44; H04N 9/64; H04N 5/91
(52) U.S. Cl. .............. 348/559; 348/715; 348/907; 386/68; 386/66
(58) Field of Search .............. 348/715, 907, 348/559, 707; 386/68, 66

(56) References Cited

U.S. PATENT DOCUMENTS

| | | | |
|---|---|---|---|
| 5,241,428 A | | 8/1993 | Goldwasser et al. ........... 360/7 |
| 5,317,399 A | * | 5/1994 | Satake et al. ............... 348/571 |
| 5,329,320 A | * | 7/1994 | Yifrach ....................... 348/738 |
| 5,371,551 A | | 12/1994 | Logan et al. ............... 348/571 |
| 5,555,463 A | | 9/1996 | Staron ....................... 348/560 |
| 5,692,213 A | * | 11/1997 | Goldberg et al. ........ 715/500.1 |
| 5,696,868 A | | 12/1997 | Kim et al. .................... 386/46 |
| 5,701,383 A | | 12/1997 | Russo et al. ................. 386/46 |
| 5,845,240 A | | 12/1998 | Fielder ........................ 704/201 |
| 6,005,564 A | * | 12/1999 | Ahmad et al. .............. 345/723 |
| 6,172,712 B1 | * | 1/2001 | Beard .......................... 348/552 |
| 6,204,886 B1 | * | 3/2001 | Yoshimura et al. ......... 348/564 |
| 2002/0048448 A1 | * | 4/2002 | Daniels ....................... 386/40 |
| 2002/0057893 A1 | * | 5/2002 | Wood et al. .................. 386/46 |

FOREIGN PATENT DOCUMENTS

WO   WO9825404   6/1998   .......... H04N/5/775

* cited by examiner

Primary Examiner—Wendy R. Garber
Assistant Examiner—James Hannett
(74) Attorney, Agent, or Firm—Gregory L. Thorne (57) ABSTRACT

A method and apparatus are provided for catching-up on viewing a program on a viewing device. The apparatus according to an embodiment of the invention includes a storing mechanism configured for simultaneously recording and playing back digital video and audio streams. A controller is configured to control the storing mechanism to record and play back the digital video and audio streams. The controller is also configured to determine an accelerated playback speed that allows a viewer to catch-up to a real time viewing of the program. A playback mechanism operatively coupled between the storing mechanism and the viewing device is configured to control a playback speed of the video and audio streams provided to the viewing device from the storage mechanism in accordance with the accelerated playback speed.

24 Claims, 5 Drawing Sheets

METHOD AND APPARATUS FOR CATCH-UP VIDEO VIEWING

BACKGROUND

1. Technical Field

The present invention relates generally to video viewing and, in particular, to a method and apparatus for catch-up video viewing.

2. Background Description

Conventional video recording/playback devices such as video cassette recorders allow for recording and playback of a video stream (as well as the accompanying audio stream). However, the two functions of recording and playback are mutually exclusive. That is, only one function may be performed at a given time.

When the telephone rings during television viewing and the viewer picks up the phone to engage in conversation (or the viewer is called away from the television for some other reason), the viewer either misses part of the television program or has to quickly start taping the television program. In the latter case, the viewer can wait until the television program is over and then rewind the tape to watch the missed parts. Alteratively, if the user desires to immediately watch the missed parts upon termination of the telephone call, the user must use a second recording/playback device to record the remainder of the television program while the user watches the missed parts from the first recording/playback device. Clearly the cost of owning two recording/playback devices may be prohibitive to some people. Moreover, the use of two recording/playback devices inconveniently requires the viewer to coordinate his efforts between the two devices.

Thus, it would be desirable and highly advantageous to have a method and apparatus that allows a user to watch missed parts of a program while simultaneously recording the remainder of the program.

SUMMARY OF THE INVENTION

The present invention is directed to a method and apparatus for catching-up on viewing a program such as a television program.

In one aspect of the present invention, a method for catching-up on viewing a program on a viewing device includes the step of recording the program, when a first time instance is identified corresponding to a viewer not viewing the program. An accelerated viewing speed is then calculated that allows a viewer to catch-up to a real time viewing of the program. The speed is based on at least a difference between the first time instance and a second time instance when the viewer is ready to resume viewing of the program. A portion of the program is played back at the accelerated viewing speed while recording a subsequent portion of the program, until the viewer is caught-up to the real time viewing of the program.

In another aspect of the present invention, an apparatus for catching-up on viewing a program on a viewing device includes a storing mechanism configured for simultaneously recording and playing back digital video and audio streams. A controller is configured for controlling the storing mechanism to record and play back the digital video and audio streams, and for determining an accelerated playback speed that allows a viewer to catch-up to a real time viewing of the program. A playback mechanism operatively coupled between the storing mechanism and the viewing device is configured for controlling a playback speed of the video and audio streams provided to the viewing device from the storage mechanism in accordance with the accelerated playback speed.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method and apparatus for catching-up on viewing a program such as a television program. The present invention allows a user to watch missed parts of a program while simultaneously recording the remainder of the program. In this way, the user may catch-up to the real time broadcast of the program.

The present invention may be used to catch-up on the viewing of any type of video program (analog or digital) from any type of source (e.g., antenna, cable, or satellite). Further, the present invention may also be used to catch-up on any audio accompanying the video program. Accordingly, any reference to a video program or video stream may be considered to include an accompanying audio stream.

Figure 1:
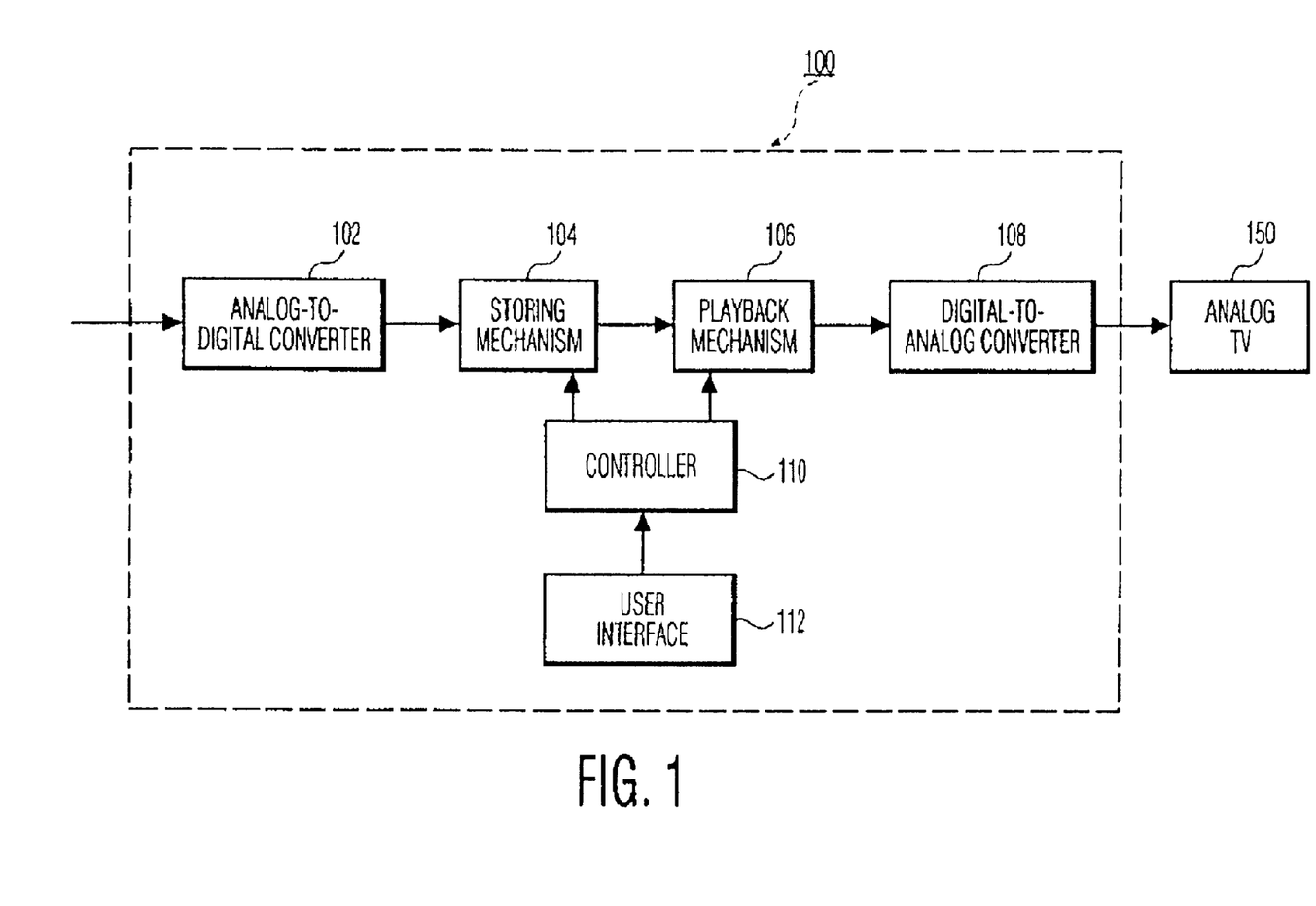
FIG. 1 is a block diagram of a viewing device operatively coupled to an apparatus for catching-up on viewing a program according to an embodiment of the present invention.

FIG. 1 is a block diagram of a viewing device 150 operatively coupled to an apparatus 100 for catching-up on viewing a program according to an embodiment of the present invention. The apparatus 100 includes: an analog-to-digital converter (ADC) 102 for converting analog video and audio streams to digital video and audio streams; a storing mechanism 104 operatively coupled to ADC 102 for storing (recording) and outputting (playing back) digital video and audio streams; a playback mechanism 106 operatively coupled to storing mechanism 104 for controlling the playback speed of the video and audio streams provided to viewing device 150 from storage mechanism 104; a digital-to-analog converter (DAC) 108 operatively coupled to playback mechanism 106 for converting the digital video and audio streams to analog video and audio streams; a controller 110 for controlling storing mechanism 104 and playback mechanism 106; and a user interface 112 for inputting commands to controller 110. The DAC 108 is also operatively coupled to viewing device 150.

In the embodiment, storage mechanism 104 is a hard disk drive. However, the present invention is not limited to a particular storage device and, thus, any suitable storage device may be used.

Moreover, in the embodiment, viewing device 150 is an analog television. However, any type of viewing device may used with the present invention. For example, viewing device 150 may be a digital television, in which case ADC 102 and DAC 108 may not be required. As another example, given the prevalence of the internet, viewing device 150 may be a computer monitor, in which case live video broadcasts may be viewed on the monitor while any accompanying audio may be output from the computer's speakers. It is to be appreciated that the invention may be readily modified by one skilled in the art to accommodate any type of viewing device while maintaining the spirit and scope of the invention.

The television 150 is provided with video and audio streams from a direct cable hookup. The output of the cable is input to ADC 102. Alternatively, the video and audio streams may be provided from another source, such as, for example, an antenna or a satellite dish (not shown).

The playback mechanism 106 may be, for example, a delay or buffer. However, any device suitable for controlling the input rate of information to viewing device 150 may be used.

According to the present invention, the playback speed of the video and audio streams is controlled so that they play at a slightly accelerated speed until the viewer catches up to real time.

Figure 2:
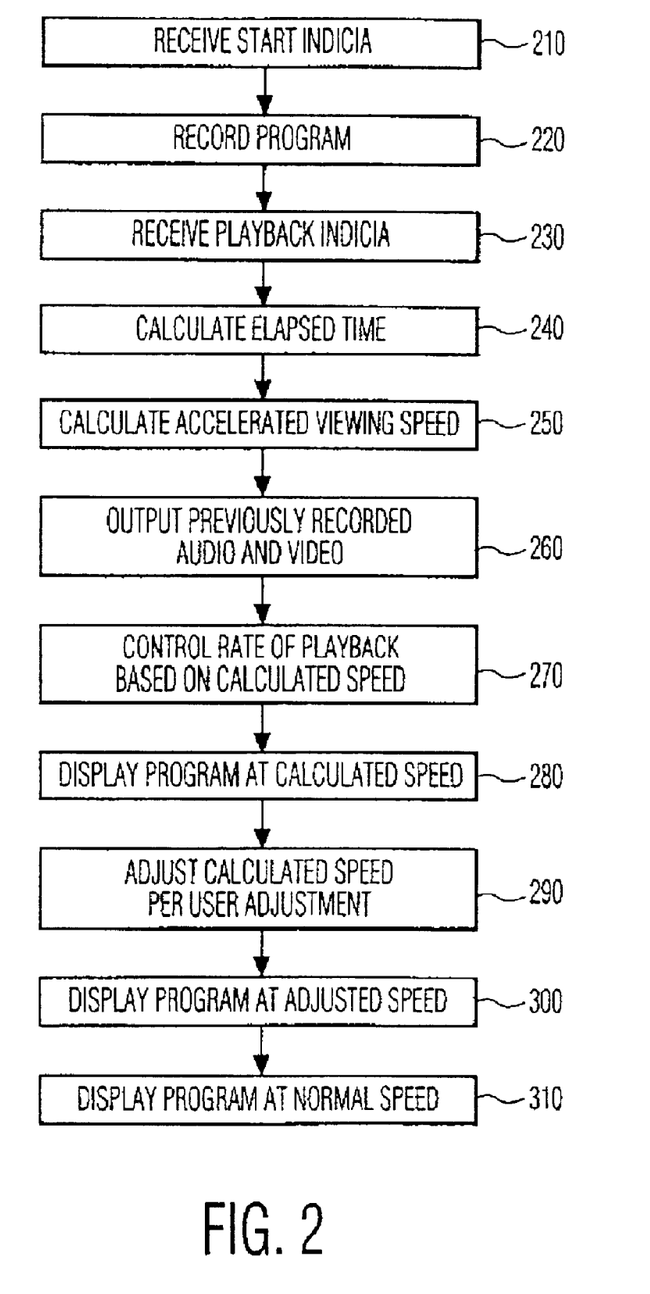
FIG. 2 is a flow chart of a method for catching-up on viewing a program according to an embodiment of the present invention.

FIG. 2 is a flow chart of a method for catching-up on viewing a program according to an embodiment of the present invention. When the phone rings or a viewer is called away for some other reason while watching a program on a television, the viewer depresses a "catch-up start" button of user interface 112 to provide indicia to controller 110 indicating that the program should be recorded (step 210). At that point, controller 110 controls storing mechanism 104 to record the program (step 220).

When the viewer returns and is ready to resume viewing of the program, the viewer depresses a "catch-up playback" button of user interface 112 to provide indicia to controller 110 indicating that the viewer is ready to view a play back of the program (step 230). At that point, controller 110 controls storing mechanism 104 to continue recording the program.

Meanwhile, the time elapsed since the viewer was away from the television is calculated by controller 110 (i.e., the time difference between the depressing of the "catch-up start" button and the "catch-up playback" button) (step 240). Further, controller 110 calculates an optimum accelerated viewing speed at which the previously recorded video and audio streams (corresponding to the missed parts of the program) are to be played back (step 250). It is to be appreciated that in order for the viewer to catch-up to the real time broadcast of the program, a portion of the program recorded after the user has depressed the "catch-up playback" button must also be viewed at an accelerated rate. Thus, the accelerated viewing speed calculated by controller 110 must take into account the time required to catch-up.

The storage mechanism 104 is then controlled by controller 110 to output (playback) the previously recorded video and audio streams corresponding to the missed parts of the program (including those parts of the program corresponding to the time period after which the viewer has depressed the "catch-up playback" button and during which the viewer is catching-up) (step 260). The video and audio streams output from storage mechanism 104 are passed through playback mechanism 106 which controls the rate at which the video and audio streams are provided to viewing device 150 in accordance with the accelerated viewing speed calculated by controller 110 (step 270). The video and audio streams are then displayed on viewing device 150 in accordance with the calculated viewing speed (step 280).

If the calculated viewing speed of the displayed video and audio streams is too fast or too slow for the viewer's liking, the viewer may adjust the speed via a slider or similar device of user interface 112 so that controller 110 controls playback mechanism 106 to speed up or slow down the streams in accordance with the user's adjustment (step 290). The video and audio streams are then displayed on viewing device 150 in accordance with the adjusted viewing speed (step 300). When the viewer has caught up to the real time broadcast of the program, the video and audio are displayed at the normal speed (step 310).

In another embodiment of the present invention, commercials may be edited out of the played back video and audio streams. This may be accomplished by providing the user with a choice of depressing one of two buttons at step 230 of the method of FIG. 2. The first button may be the "catch-up playback" button as described above. However, the second button would be a "catch-up playback//no commercials" button. When the second button is depressed, the controller would locate any commercials in the recorded video and audio streams (step 245), the accelerated viewing speed calculated by controller 110 at step 250 would take into account the commercials, and the commercials would be bypassed upon playback.

Figure 3:
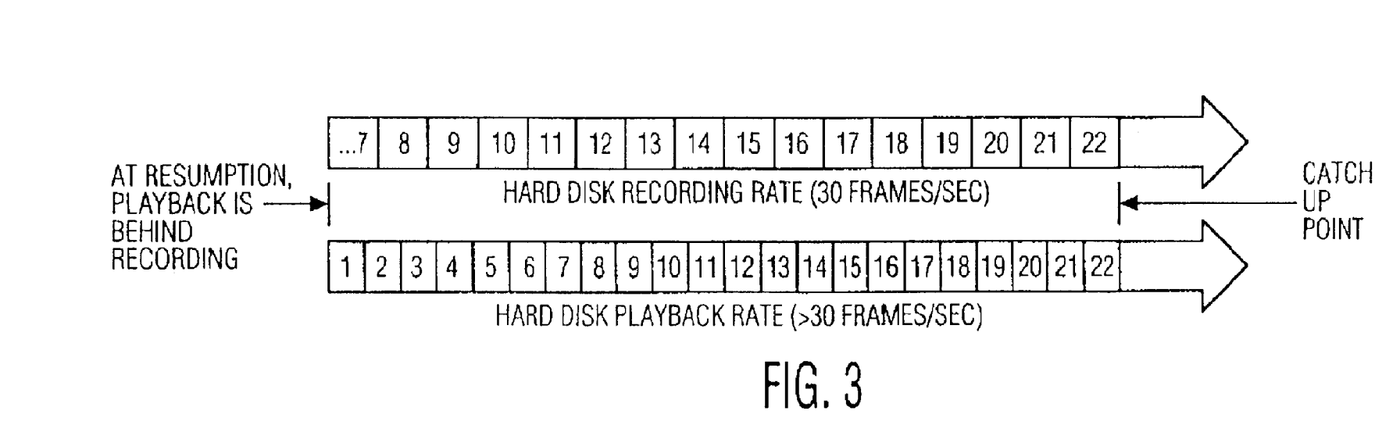
FIG. 3 is a diagram illustrating the recording and playback rates of the apparatus of FIG. 1 according to an embodiment of the present invention.

FIG. 3 is a diagram illustrating the recording and playback rates of the apparatus of FIG. 1 according to an embodiment of the present invention. At the time the viewer resumes viewing the program, the location in the video stream at which playback (of missed parts) is commencing is behind the location in the video stream currently being recorded. As an example, during recording, the video (and audio) stream is being recorded at a rate of 30 frames per second. However, to catch the viewer up during playback, the video stream is played back at a rate greater than 30 frames per second.

Figure 4:
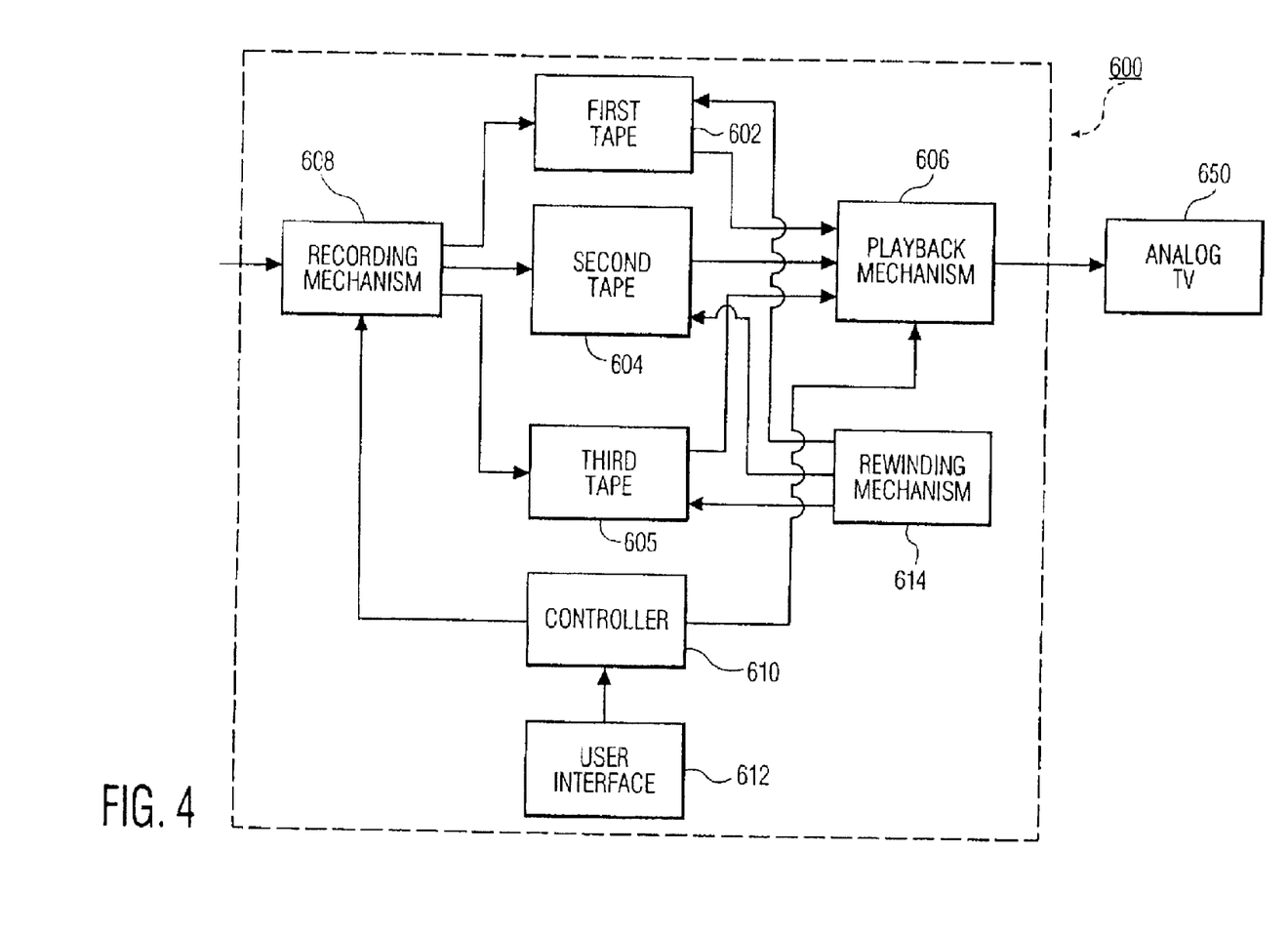
FIG. 4 is a block diagram of a viewing device operatively coupled to an apparatus for catching-up on viewing a program according to yet another embodiment of the present invention.

FIG. 4 is a block diagram of a viewing device 650 operatively coupled to an apparatus 600 for catching-up on viewing a program according to yet another embodiment of the present invention. The apparatus 600 includes: first, second, and third magnetic tapes 602, 604, 605 for storing video and audio streams thereon; a playback mechanism 606 for playing back the video and audio streams stored on the first, second, and third magnetic tapes; a recording mechanism 608 for recording the video and audio streams to the first, second, and third magnetic tapes; a controller 610 for controlling the playback and recording mechanisms 606, 608; a user interface 612 for inputting commands to controller 610; and a rewinding mechanism 614 for rewinding first, second, and third magnetic tapes, 602, 604, and 605. While rewinding mechanism 614 is shown as a separate physical unit from recording and playback mechanisms 606, 608 in the embodiment of FIG. 4, rewinding mechanism may be included as part of one or both of recording and playback mechanisms 606, 608.

It is to be appreciated that third magnetic tape 605 may be replaced by a digital buffer 620. The buffer may be a stand alone device, or it may be incorporated into playback mechanism 406. In any event, digital buffer would be preceded by an analog-to-digital converter 622 and succeeded by a digital-to-analog converter 624. However, one skilled in the art may readily modify the structure of the above apparatus to take into account whether the program is provided in analog or digital form, and also whether the program is to be played on a device for playing back analog (e.g., conventional televisions) signals or one for playing back digital signals (e.g., high definition television (HDTV)).

It is to be further appreciated that since recording is being performed on magnetic tapes, straight cycling between playing back from one tape and recording onto another tape will not provide an uninterrupted view of the program. This is because once a portion of the program has been recorded on a particular tape, that tape must be rewound back to the point where the last recording session began. To compensate for the "rewind time", the third magnetic tape (or buffer) has been added. For example, the third magnetic tape may be used to play back the program when the first tape is recording and the second tape is rewinding.

Figure 5:
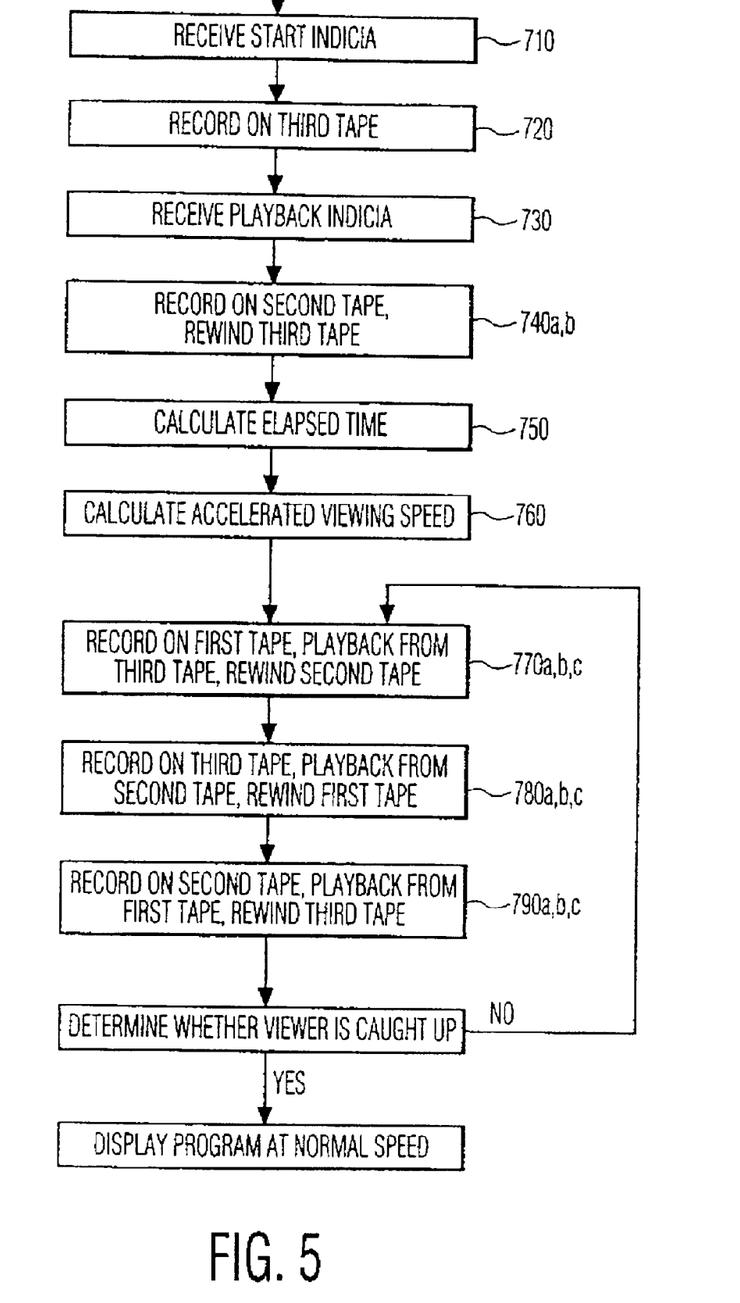
FIG. 5 is a flow chart of a method for catching-up on viewing a program according to yet another embodiment of the present invention.

FIG. 5 is a flow chart of a method for catching-up on viewing a program according to yet another embodiment of the present invention. In particular, the method is applicable to the apparatus of FIG. 4. When the phone rings or a viewer is called away for some other reason while watching a program on a television, the viewer depresses a "catch-up start" button of user interface 612 to provide indicia to controller 610 indicating that the program should be recorded (step 710). At that point, controller 610 controls recording mechanism 608 to record the program on third magnetic tape 605 (step 720).

When the viewer returns and is ready to resume viewing of the program, the viewer depresses a "catch-up playback" button of user interface 612 to provide indicia to controller 610 indicating that the viewer is ready to view a play back of the program (step 730). Accordingly, controller 610 controls recording mechanism 608 to cease recording on third magnetic tape 605, and to begin recording on second magnetic tape 604 (step 740*a*). Also, controller 610 controls rewinding mechanism 614 to rewind third magnetic tape 605 (step 740*b*).

Meanwhile, the time elapsed since the viewer was away from the television is calculated by controller 610 (step 750). Further, controller 610 calculates an optimum accelerated viewing speed at which the previously recorded video and audio streams (corresponding to the missed parts of the program) are to be played back (step 760).

Upon third magnetic tape 605 being rewound, controller 610 controls recording mechanism 608 to cease recording on second magnetic tape 604, and to begin recording on first magnetic tape 602 (step 770*a*). Moreover, controller 610 controls playback mechanism to begin playing back the portion of the program recorded on third magnetic tape 605 in accordance with the accelerated viewing speed calculated by controller 610 (step 770*b*). Also, controller 610 controls rewinding mechanism 614 to rewind second magnetic tape 604 (step 770*c*).

Upon completing the playback of the portion of the program recorded on third magnetic tape 605, controller 610 controls recording mechanism 608 to cease recording on first magnetic tape 602, and to begin recording on third magnetic tape 605 (step 780*a*). Moreover, controller 610 controls playback mechanism to begin playing back the portion of the program recorded on second magnetic tape 604 in accordance with the accelerated viewing speed calculated by controller 610 (step 780*b*). Also, controller 610 controls rewinding mechanism 614 to rewind first magnetic tape 602 (step 780*c*).

Upon completing the playback of the portion of the program recorded on second magnetic tape 604, controller 610 controls recording mechanism 608 to cease recording on third magnetic tape 605, and to begin recording on second magnetic tape 604 (step 790*a*). Moreover, controller 610 controls playback mechanism to begin playing back the portion of the program recorded on first magnetic tape 602 in accordance with the accelerated viewing speed calculated by controller 610 (step 790*b*). Also, controller 610 controls rewinding mechanism 614 to rewind third magnetic tape 605 (step 790*c*).

It is then determined whether the viewer has caught up to the real time broadcast of the program (step 800). If not, then a return is made to step 770 (with step 770*a* now being performed upon the completion of the playback of the portion of the program recorded on first magnetic tape 602) (step 810). However, if so, then the program is displayed at the normal speed (step 820). Similar to the method of FIG. 2, commercials may be edited out of the played back video and audio streams.

Although the illustrative embodiments have been described herein with reference to the accompanying drawings, it is to be understood that the present apparatus and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An apparatus for permitting a viewer to view previously recorded material and catch-up with a real time viewing of a program on a viewing device, comprising:

a storing mechanism configured for simultaneously recording and playing back digital video and audio streams;

a controller configured for controlling said storing mechanism to record and play back the digital video and audio streams, said controller calculates an initial optimum accelerated playback speed comprising a catch-up speed to play back a portion of the video and audio streams that were not viewed, said initial optimum catch-up speed based upon a time in which the video and audio streams were unviewed so as to permit viewing at the catch-up speed that allows a viewer to catch-up to a real time viewing of the program, wherein said catch-up speed calculated by the controller includes taking into account a time period for commercials that are bypassed upon viewing at the catch-up speed; and a playback mechanism operatively coupled between said storing mechanism and the viewing device configured for controlling a playback speed of the video and audio streams provided to the viewing device from said storage mechanism in accordance with the accelerated playback speed.

2. The apparatus according to claim 1, further comprising a user interface configured for inputting commands to said controller.

3. The apparatus according to claim 2, wherein the commands comprise a first command indicating a time when the viewer is not viewing the program and a second command indicating a time when the viewer is ready to resume viewing of the program.

4. The apparatus according to claim 3, wherein the accelerated playback speed is based on at least the difference between the time corresponding to the first command and the time corresponding to the second command.

5. The apparatus according to claim 3, wherein said storing mechanism begins recording the program at the time corresponding to the first command.

6. The apparatus according to claim 3, wherein said storing mechanism begins playing back a portion of the recorded program while recording a subsequent portion of the program at the time corresponding to the second command.

7. The apparatus according to claim 1, further comprising an analog-to-digital converter operatively coupled to said storing mechanism for converting analog video and audio streams to the digital video and audio streams.

8. The apparatus according to claim 1, wherein the viewing device is an analog viewing device, and the apparatus further comprises a digital-to-analog converter operatively coupled between said playback mechanism and the viewing device for converting the digital video and audio streams to analog video and audio streams.

9. The apparatus according to claim 1, wherein said storage mechanism is a hard disk drive.

10. The apparatus according to claim 1, wherein the viewing device is one of a television and a computer monitor.

11. The apparatus according to claim 1, wherein said playback mechanism is one of a delay and buffer.

12. The apparatus according to claim 1, further comprising a speed control device operatively coupled to said controller configured for allowing the viewer to override and adjust the playback speed of the video and audio streams provided to the viewing device from said storage mechanism.

13. The apparatus according to claim 1, further comprising an editing device operatively coupled to said storing mechanism and said controller configured for detecting and removing commercials from the digital video and audio streams.

14. A method for permitting a viewer to catch-up to real time viewing of a program while viewing previously recorded material from said program on a viewing device, comprising the steps of:
    recording the program, when a first time instance is identified corresponding to a viewer not viewing the program;
    calculating an accelerated playback speed comprising an initial optimum catch-up speed to play back a portion of the program in which the view did not view the program, said initial optimum catch-up speed calculated by a time period of the non-viewing so as to permit viewing at the optimum catch-up speed that allows a viewer to catch-up to a real time viewing of the program, said time period being based on at least a difference between the first time instance and a second time instance when the viewer is ready to resume viewing of the program so as to determine the initial optimum catch-up speed, wherein said catch-up speed calculated by the controller includes taking into account a time period for commercials that are bypassed upon viewing at the catch-up speed; and
    playing back a portion of the program at the accelerated viewing speed while recording a subsequent portion of the program, until the viewer is caught-up to the real time viewing of the program.

15. The method according to claim 14, further comprising the step of allowing the viewer to override and adjust the accelerated viewing speed.

16. The method according to claim 14, further comprising the step of detecting and removing commercials from the program.

17. An apparatus for catching-up on viewing a program on a viewing device, comprising:
    first, second, and third magnetic tapes configured for storing video and audio streams thereon;
    a playback mechanism configured for playing back the video and audio streams from said first, second, and third magnetic tapes on the viewing device;
    a recording mechanism configured for recording the video and audio streams to said first, second, and third magnetic tapes;
    a rewinding mechanism configured for rewinding said first, second, and third magnetic tapes; and
    a controller configured for calculating an initial optimum accelerated playback speed comprising a catch-up speed so as to play back a portion of the video and audio streams that were not viewed/listened thereto, said initial optimum catch-up speed based upon a time in which the video and audio streams were unviewed so as to permit viewing at an accelerated playback speed that allows a viewer to catch-up to a real time viewing of the program, and for controlling said recording, playback, and rewinding mechanisms to cycle between recording, playback, and rewinding modes, respectively, until the viewer is caught up to the real time viewing of the program, wherein said controller controls said playback mechanism to playback the video and audio streams in accordance with the accelerated playback speed, and
    wherein said catch-up speed calculated by the controller includes taking into account a time for commercials that are bypassed upon viewing at the catch-up speed.

18. The apparatus according to claim 17, further comprising a user interface configured for inputting commands to said controller.

19. The apparatus according to claim 18, wherein the commands comprise a first command indicating a time when the viewer is not viewing the program and a second command indicating a time when the viewer is ready to resume viewing of the program.

20. The apparatus according to claim 19, wherein the accelerated playback speed is based on at least the difference between the time corresponding to the first command and the time corresponding to the second command.

21. The apparatus according to claim 17, further comprising a speed control device operatively coupled to said controller configured for allowing the viewer to override and adjust the playback speed of the video and audio streams provided to the viewing device.

22. A method for catching-up on viewing a program on a viewing device, comprising the steps of:
    (a) recording the program on a first magnetic tape, when a first time instance is identified corresponding to a viewer not viewing the program;
    (b) recording the program on a second magnetic tape and rewinding the first magnetic tape, when a second time instance is identified corresponding to the viewer being ready to resume viewing of the program;
    (c) calculating an accelerated viewing speed comprising an initial optimum catch-up speed to play back a portion of the video and audio streams that were not viewed, said initial optimum catch-up speed based upon a time in which the video and audio streams were unviewed so as to permit viewing at the catch-up speed so that the viewer can catch-up to a real time viewing of the program, the speed being based on at least a difference between the first and second time instances, wherein said catch-up speed calculated by the controller includes taking into account a time for commercials that are bypassed upon viewing at the catch-up speed;

(d) recording on a third magnetic tape, rewinding the second magnetic tape, and playing back the recorded program from the first magnetic tape;

(e) recording on the first magnetic tape, rewinding the third magnetic tape, and playing back the recorded program from the second magnetic tape;

(f) recording on the second magnetic tape, rewinding the first magnetic tape, and playing back the recorded program from the third magnetic tape;

(g) determining whether the viewer is caught up to the real time viewing of the program; and (h) returning to step (d), when the viewer is not caught up to the real time viewing of the program.

23. The method according to claim 22, further comprising the step of allowing the viewer to override and adjust the accelerated viewing speed.

24. The method according to claim 22, further comprising the step of detecting and removing commercials from the program.

* * * * *